No. 768,682. PATENTED AUG. 30, 1904.
C. H. PARKER.
LOADING OR UNLOADING APPARATUS FOR BUILDING LEVEES OR THE LIKE.
APPLICATION FILED OCT. 2, 1903.
NO MODEL. 8 SHEETS—SHEET 2.
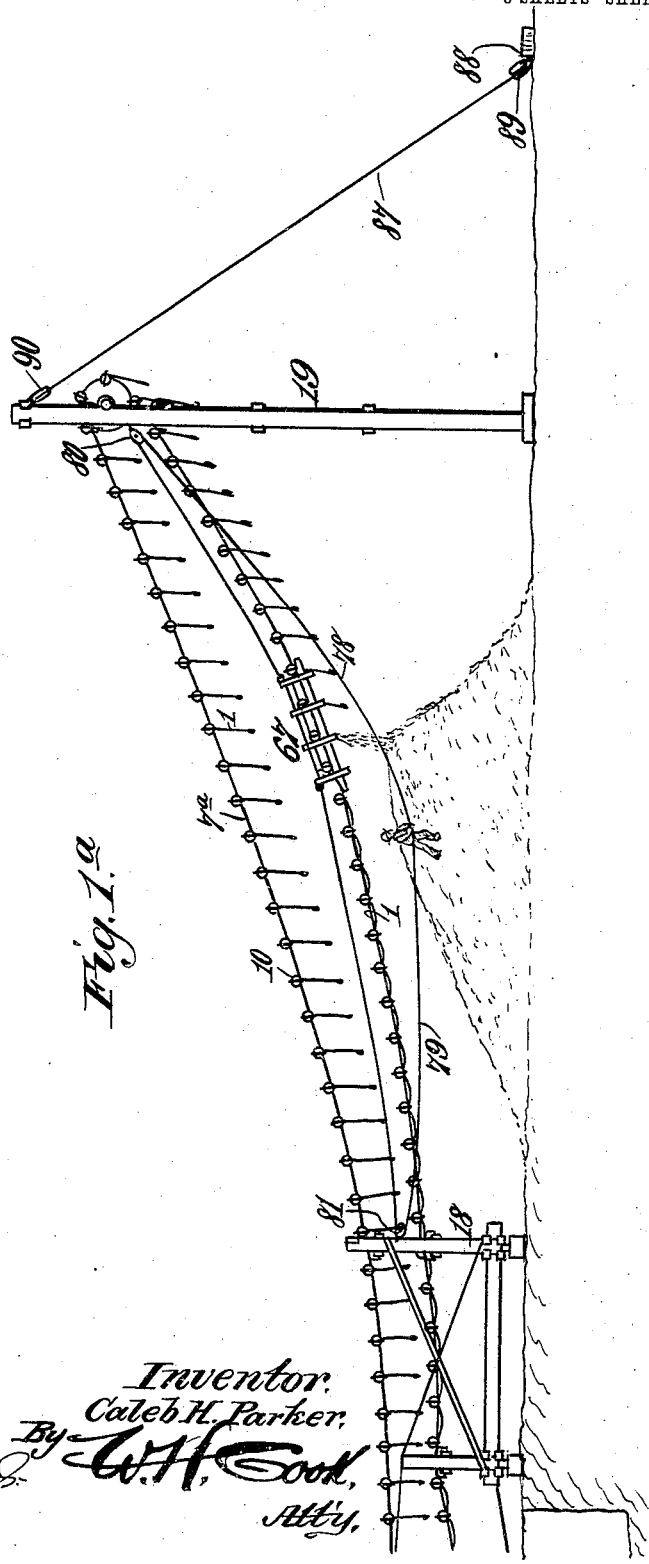
Witnesses.
Robert Everett,
James L. Norris, Jr.
Inventor.
Caleb H. Parker,
By W. H. Cook,
Atty.

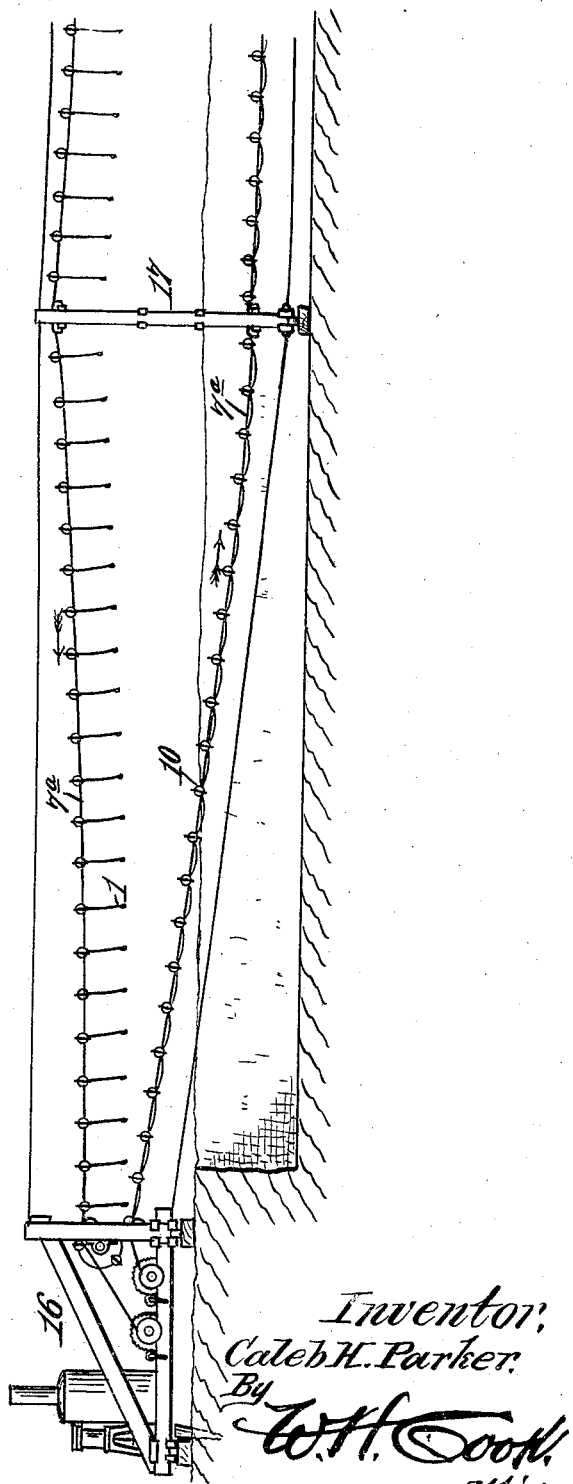

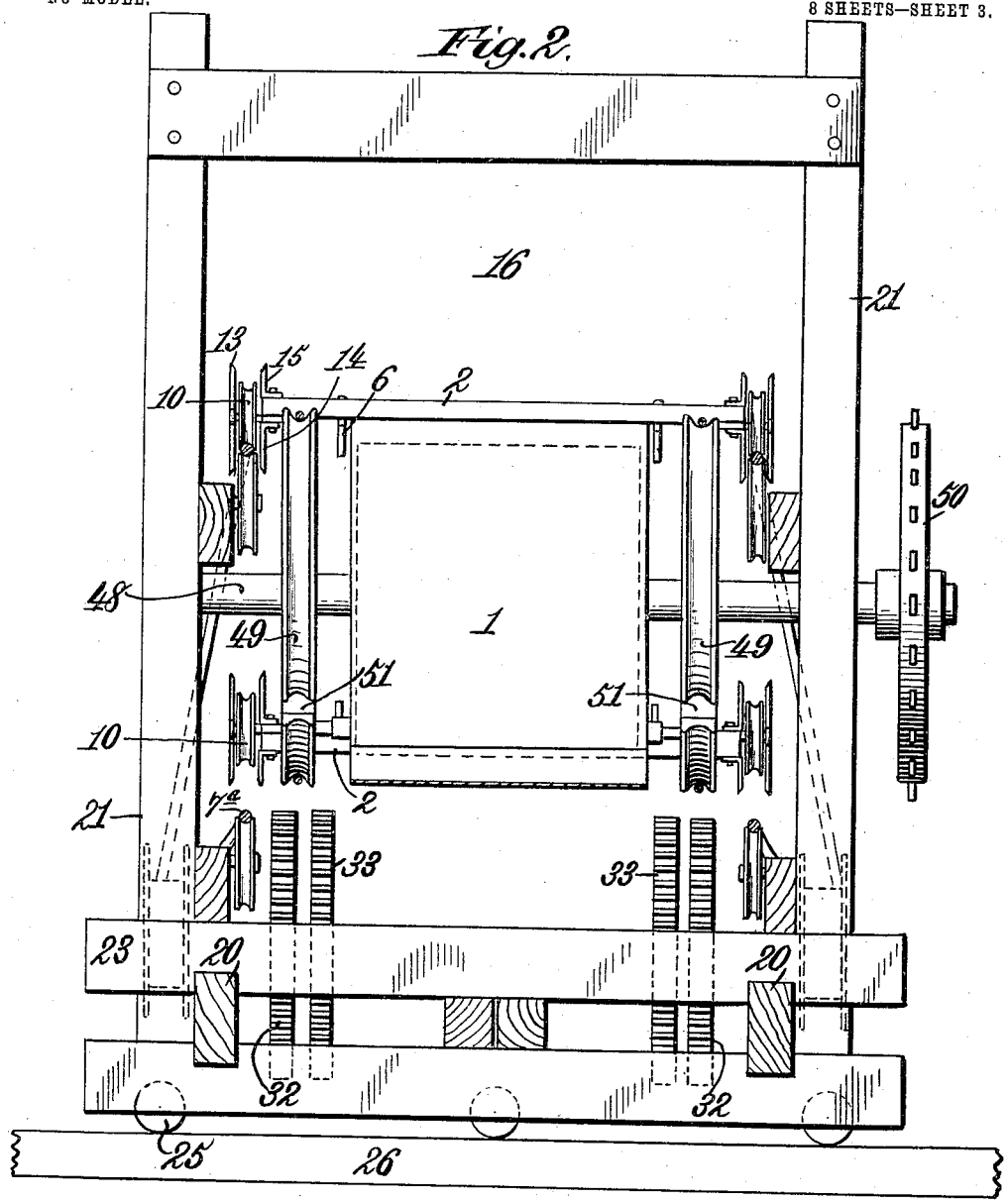

No. 768,682. PATENTED AUG. 30, 1904.
C. H. PARKER.
LOADING OR UNLOADING APPARATUS FOR BUILDING LEVEES OR THE LIKE.
APPLICATION FILED OCT. 2, 1903.
NO MODEL. 8 SHEETS—SHEET 4.
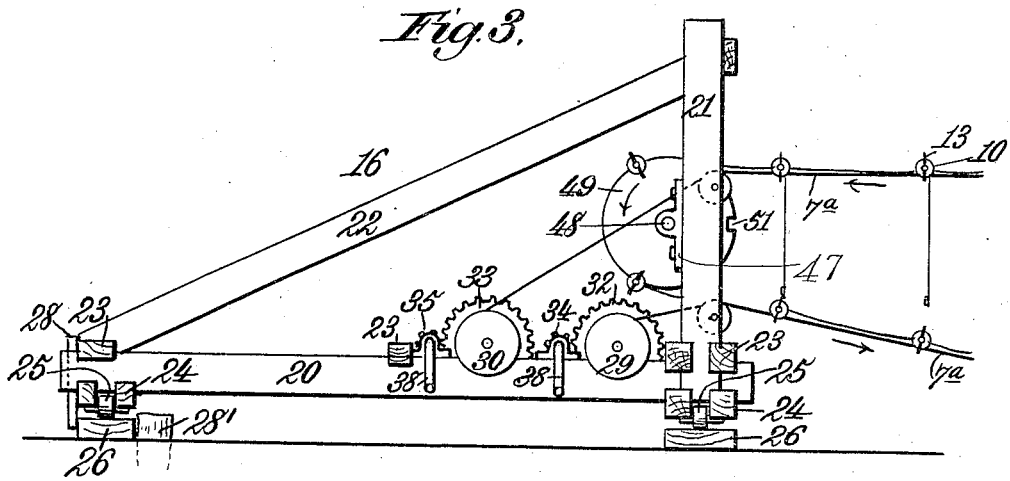
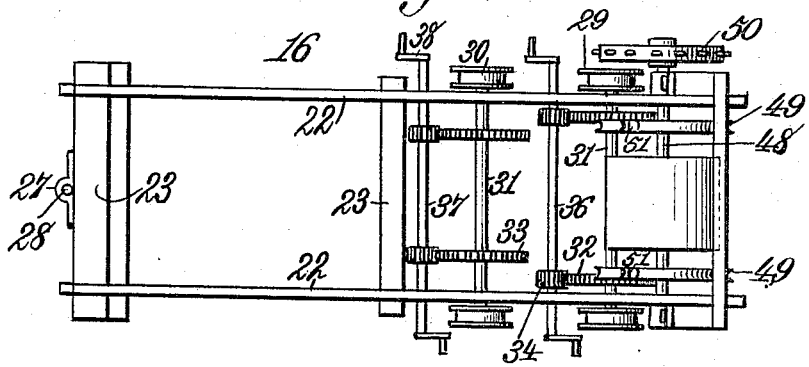
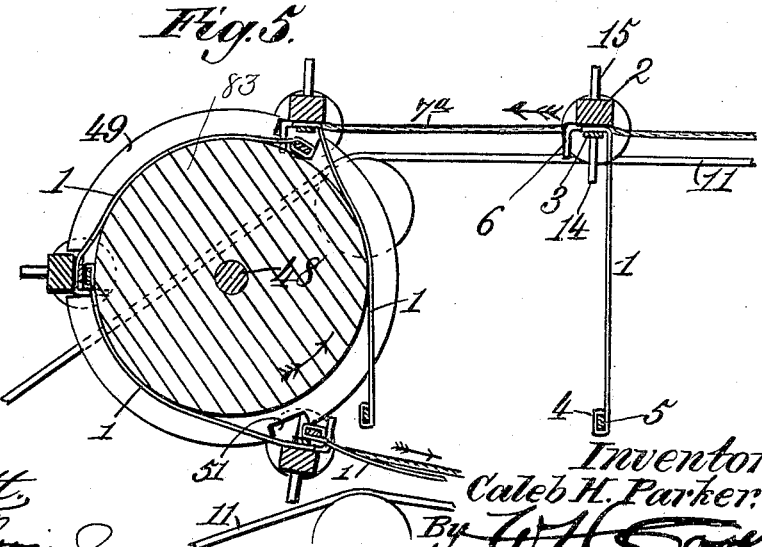
Witnesses.
Robert Everett,
James L. Norris, Jr.
Inventor.
Caleb H. Parker.
By W. H. Good
Atty.

No. 768,682. PATENTED AUG. 30, 1904.
C. H. PARKER.
LOADING OR UNLOADING APPARATUS FOR BUILDING LEVEES OR THE LIKE.
APPLICATION FILED OCT. 2, 1903.
NO MODEL. 8 SHEETS—SHEET 5.
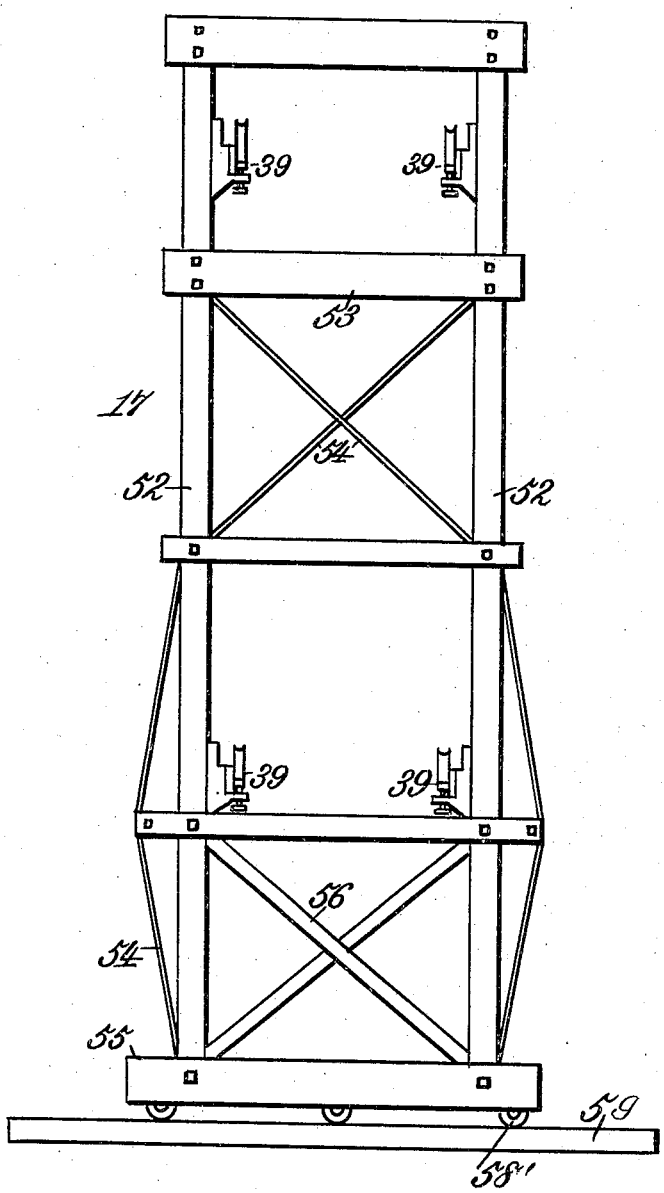
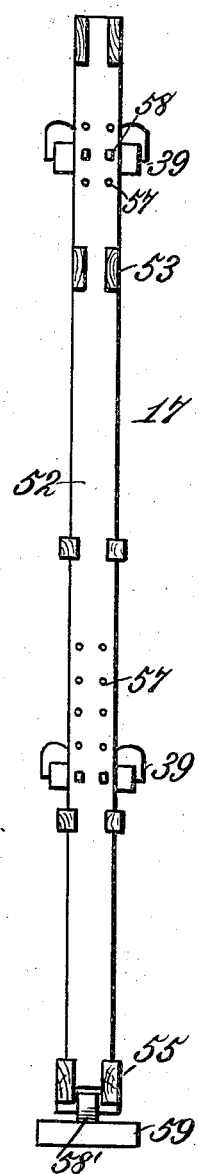
Witnesses.
Robert Everett,
James L. Norris, Jr.
Inventor.
Caleb H. Parker.
By W. H. Cook
Atty.

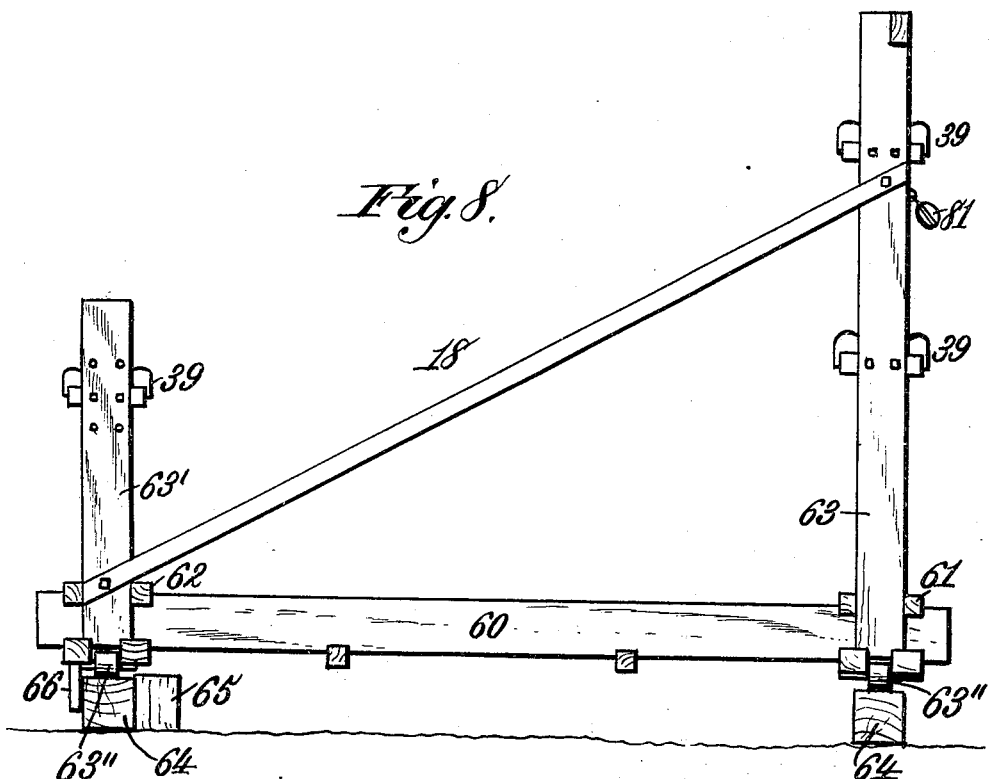
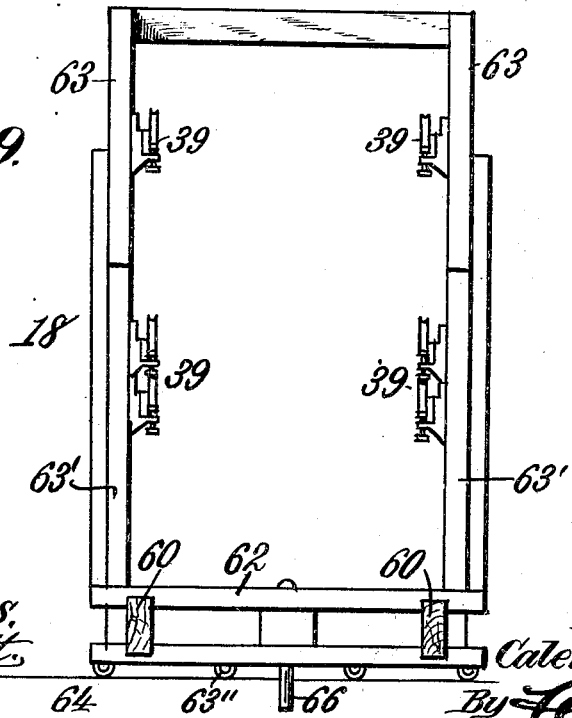

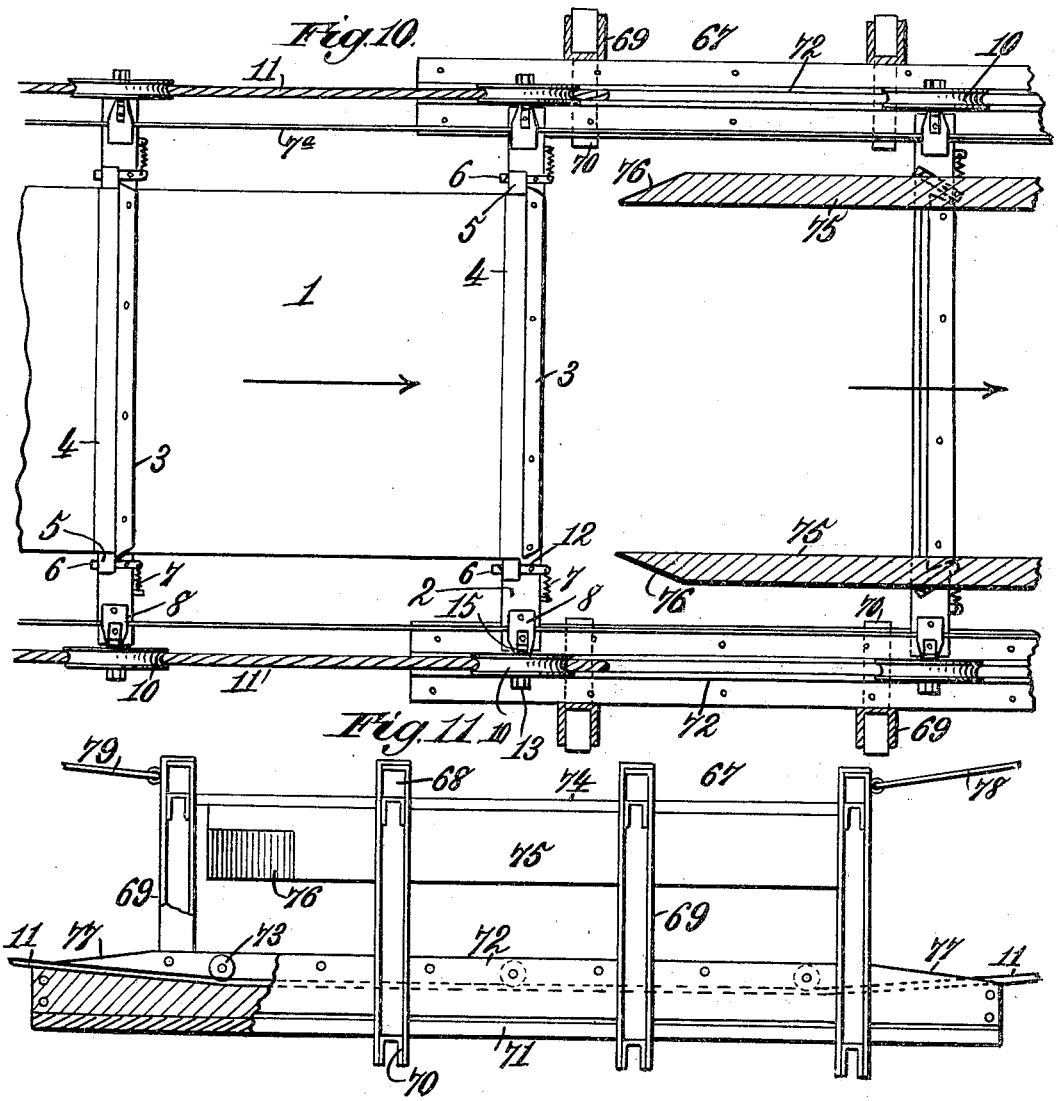
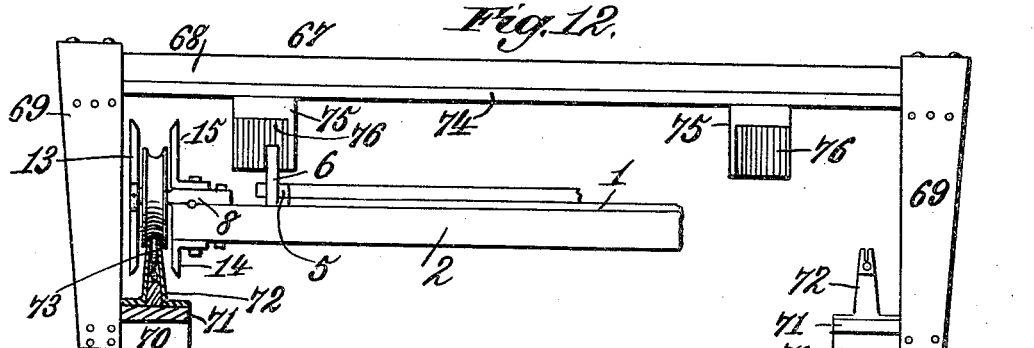

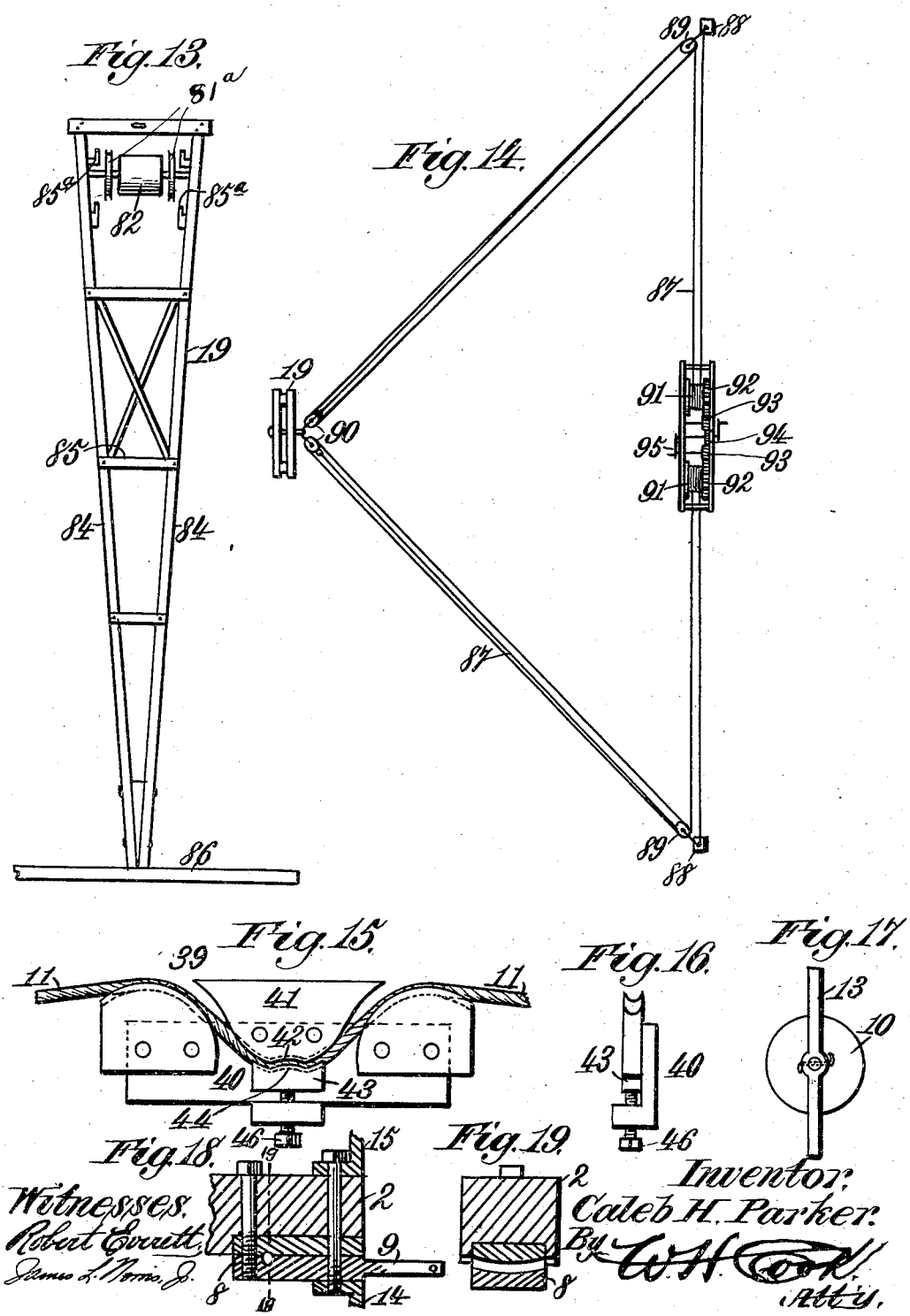

No. 768,682. Patented August 30, 1904.

UNITED STATES PATENT OFFICE.

CALEB HARRISON PARKER, OF NEW ORLEANS, LOUISIANA.

LOADING AND UNLOADING APPARATUS FOR BUILDING LEVEES OR THE LIKE.

SPECIFICATION forming part of Letters Patent No. 768,682, dated August 30, 1904.

Application filed October 2, 1903. Serial No. 175,514. (No model.)

*To all whom it may concern:*

Be it known that I, CALEB HARRISON PARKER, a citizen of the United States of America, residing at New Orleans, in the parish of Orleans and State of Louisiana, have invented certain new and useful Improvements in Loading and Unloading Apparatus for Building Levees or the Like, of which the following is a specification.

This invention relates generally to loading and unloading apparatus, and particularly to one adapted for use in building levees or other embankments.

The object of the invention is in a ready, certain, positive, and continuous manner to convey earth, sand, &c., to a desired point and effect its discharge, to render positive the operation of the apparatus, to prevent sagging of the conveyers, to effect in a novel manner the resetting of the conveyers, and generally to improve and simplify apparatus of this character.

With the above and other objects in view, as will appear as the nature of the invention is better understood, the same consists in the novel construction and combination of parts of a loading and unloading apparatus, as will be hereinafter fully described and claimed.

The apparatus of this invention embodies in its construction a carrier, a power-truck, a strain-arrester, a balance-truck, a trip-box, and a sheave-column.

The carrier consists of a series of canvas aprons carried by cross-beams, at the terminals of which are mounted wheels adapted to run upon rope tramways. The conveyer is propelled over the tramway through the medium of ropes or other flexible connections attached to the cross-beams by a novel form of grip, which ropes pass over sheaves at each end of the apparatus and constitute a continuous circuit or belt-like structure. The peculiar manner in which the conveyer is constructed renders it to all intents and purposes an endless belt, and, as will hereinafter appear, the means employed for combining the sections of the conveyer, (each section constituting, in effect, an apron,) the means for supporting the aprons, and for releasing one end of each places the conveyer under absolute control of the operator, thus enabling him to deposit the successive loads at the desired point. Furthermore, the parts of the apparatus are so arranged that the load is carried on the under side of the conveyer, thereby permitting the conveyer to work close to the earth, avoiding thereby any clogging with waste material and facilitating the charging of the successive aprons. The carrier is so constructed that all of the parts can be quickly and easily removed and damaged parts repaired without loss of time, and, further, the arrangement is such that wear and tear are reduced to a minimum.

For convenience in field-work the apparatus is put together in sections of any length, thereby adapting it for spans of any desired stretch.

The power-truck is constructed with a view to simplicity in the assemblage of its parts and certainty and positiveness of operation, and by the mechanism employed long and unbroken strands of rope can be carried, adapting the machine to any sized haul usual to such work, and the ropes can be readily reeled out for the construction of the tramway and speedily taken up for purposes of moving the apparatus.

To relieve the tramway or ropes of dangerous tension, strain-arresters are employed, embodying in part metallic grips which hold the upper and lower tram-ropes in position at any desired grade, while making no break in the tramway for the carrier-wheels. Under this construction the strain on the tram-ropes by being rested upon the earth is regulated to the limit of their strength, although the entire span of the carrier may extend over a very considerable distance. As will be apparent by the description furnished later on, the grips may be raised or lowered at will according to the character of the work, thereby permitting the carrier to pass over streams or other obstructions common to field-work. The strain-arresters are held in position by guy-ropes at their tops and bottoms, connecting with the power-truck and balance-truck. Where three or more than three strain-arresters are employed, an extra side guy-rope will be necessary.

The balance-truck is designed to support the tram-ropes opposite the power-truck and at the point where the carrier ceases to take on loads. This truck is ballasted with earth to meet the varying strains on either side, and its body rests upon iron rollers moving on timbers placed upon the ground and is held against strain by any suitable means, as by a vertically-disposed pin or stud entering any one of the bed-timbers or bearing against the outer side of either of such timbers. The uprights of the truck carry tram-rope grips, such grips being so disposed and arranged as to permit free passage between them of the carrier.

The trip-box is provided for the purpose of releasing the aprons to dump the load, and the dumping is effected by throwing or releasing the locking devices which normally hold the aprons against downward movement, such releasing mechanism operating to free one apron at a time. The trip-box is movable upon the tram-ropes and is controlled in its operation by a rope in the hand of the operator. The said box is constructed with a view to lightness and strength and has its parts so combined that danger of derangement in use is reduced to a minimum.

The sheave-column is provided for the purpose of sustaining the tram-ropes at any desired height, thus to permit of spanning embankments of any altitude, and is supported in such manner as to permit of its turning in a horizontal plane and to swing freely in the direction of the tramway-ropes, drive-ropes, and of the carrier. Further and more specific details of construction will be hereinafter fully described and claimed.

In the accompanying drawings, forming a part of the specification, and in which like characters of reference indicate corresponding parts, there is illustrated one form of embodiment of invention capable of carrying the same into practical operation, it being understood that the elements therein exhibited may be varied or changed as to shape, proportion, and exact manner of assemblage without departing from the spirit thereof.

In the drawings, Figures 1 and 1$^a$ when taken together is a view in side elevation of a loading and unloading apparatus. Fig. 2 is an end elevation of a power-truck. Fig. 3 is a side elevation of the power-truck. Fig. 4 is a top plan view of the power-truck. Fig. 5 is a detail view in section of one of the drive-sheaves and a portion of the sectional conveyer. Fig. 6 is a front elevation of a strain-arrester. Fig. 7 is a side elevation of the strain-arrester. Fig. 8 is a side elevation of the balance-truck. Fig. 9 is an end elevation of the balance-truck. Fig. 10 is a sectional plan view of a portion of the sectional conveyer and trip-box. Fig. 11 is a sectional side elevation of the trip-box. Fig. 12 is a sectional end elevation of the trip-box. Fig. 13 is a front elevation of the sheave-column. Fig. 14 is a top plan view of the sheave-column and guy-ropes. Fig. 15 is a side elevation of one of the tram-rope grips. Fig. 16 is an end elevation of the tram-rope grip shown in Fig. 15. Fig. 17 is a detail view of one of the sheaves and its guards. Fig. 18 is a sectional detail view of one of the drive-rope clamps. Fig. 19 is a section of the same, taken on the line 19 19 of Fig. 18.

In describing this invention the parts will be explained in the order defined in the statement of invention.

*Carrying mechanism.*—The carrier, which is in the nature of an endless conveyer, is constructed of a plurality of aprons 1, which may be of any desired length, and one end of each of the aprons is secured in any suitable manner to a cross-beam 2, as by a strip 3 of wood or metal held assembled with the cross-beams by screws or other equivalent form of fastening devices. Each apron is formed at one end with a pocket 4, in which is housed a batten 5, either of wood or metal, that extends at each end a sufficient distance beyond the side of the apron to engage with latches 6, pivotally connected with the cross-beam, the latches being held normally in a position at right angles to the length of the cross-beam by springs 7. In order to present a continuous or belt-like structure, the aprons are connected up in series through the medium of drive-ropes 7$^a$, one at each side of the conveyer, the said ropes beng firmly secured to the cross-beams by clamps 8, between which and the cross-beams the ropes are disposed. Each of the clamps has a reduced outer end forming an axle 9, upon which is mounted a sheave 10, said sheaves being designed to travel upon tram-ropes 11 to be described further on. Each apron-latch 6 is angular or approximately L shape in shape, one arm 12 of which projects beyond the cross-beam and serves as a rest for the batten. When the apron is positioned and is moving, it presents an approximately horizontal surface, upon which the sand, dirt, or the like may rest without danger of spilling or working over the sides of the apron, the flexible character of which will permit its center to sag, and thus hold the dirt or the like in proper position thereon. It will of course be understood that in apparatus of this character the dirt has frequently to be transported a considerable distance, and by the arrangement shown it will be only necessary to add additional aprons to meet the requirements of the case. For convenience in field-work the conveyer is constructed in sections varying from twenty to fifty feet in length, more or less, making it thus adaptable for any span desired. Inasmuch as to connect the sections it will only be necessary to provide the cross-beams and attached aprons and secure the clamps 8 to draw-ropes, it will be seen that to increase the length of the carrier as desired will only necessitate the inclusion of additional aprons and the securing of them in position by the clamps 8. To prevent disconnection of the sheaves 10 from the tram-ropes, each of the axles 9 is provided with a guard 13, and secured to each of the clamps and to the cross-beams on the side opposite the clamp are two similar guards 14 and 15, between which the tram-ropes work, as clearly shown in Fig. 12.

*Power-truck.*—The tram-ropes, of which there are in this instance four in number, extend from a power-truck 16 over strain-arresters 17, a balance-truck 18, and to a sheave-column 19, as shown in Figs. 1 and 1ª. The power-truck comprises base-beams 20, uprights 21, and brace-beams 22, by which the uprights are held rigid against any tendency to sag or lean. The frame of the truck is braced against lateral yield by cross-braces 23, of which there may be any preferred number, in this instance three, between the two forward ones of which the uprights 21 are clamped, as clearly shown in Figs. 3 and 4. Secured to the base-beams are pairs of sill-beams 24, between which are mounted rollers 25, resting upon a bed 26, preferably of timbers, the rollers being provided to permit of the power-truck being shifted laterally to keep the tram-ropes in the desired alinement or for other purposes. The rear end of the power-truck is provided with an eye or keeper 27, through which projects a pin 28, engaging the rear bed-timber 26, a post 28', sunk in the ground and against which the rear bed-timber rests, serving to hold the power-truck against longitudinal movement. In order to allow lengthening or shortening of the tram-ropes to compensate for the length of the conveyer—that is to say, to permit of lengthening of the tram-ropes when the conveyer has to be lengthened, and vice versa—two pairs of reels 29 and 30 are employed, which are mounted on the extremities of a pair of shafts 31, journaled in suitable bearings on the base-beams of the power-truck. Each of these shafts carries two gear-wheels 32 and 33, respectively, which are disposed between the base-beams and are engaged by pinions 34 and 35, respectively, carried by a pair of shafts 36 and 37, the terminals of each of the shafts being provided with cranks 38, by which the shafts may be turned. It will be seen that by operating the crank-shafts the reels may be turned in the direction requisite to lengthen or shorten the tram-ropes, as required, and also to keep them under requisite tension.

*Tram-rope-gripping mechanism.*—In order to hold the tram-ropes under adjusted tension and to prevent any sagging between the various supports described, grips 39 are employed in connection with each of the tram-rope supports, the construction of the grips being shown in detail in Figs. 15 and 16. Each grip comprises two jaws 40 and 41, the jaw 40 being bolted or otherwise suitably secured to the uprights of the strain-arresters, to the balance-truck, and sheave-column. The jaw 41 is provided on its upper side with curved seats, and intermediate of the length of the jaw the curved portion is provided with an upward-curved depression 42, which is provided to form a kink or bend in the rope, thus positively to prevent slipping. The upper wall of the jaw is grooved to receive the tram-rope, as is also the under side of the jaw 41, the latter being also suitably bolted to the support carrying it. As a means for clamping the rope between the jaws there is a block 43 provided, the upper side of which is grooved to receive the rope and is provided with an upward-extending projection 44 adapted to fit within the depression 42 in the jaw 41, a bolt 46, carried by the jaw 40 and engaging the under side of the block 43, serving to force the latter upward against the jaw 41. It will be seen by means of the kink formed in the rope intermediate of the length of the grip that the rope will be securely held against possibility of slippage. The upper side of the jaw 41 when positioned forms a continuation of the upper surface of the track-rope, so that a smooth and uninterrupted track is presented to the sheaves 10. The provision of these grips is of importance, as where the conveyer is of great length it would otherwise be impossible to prevent sagging of the tram-ropes between their supports, so that the conveyer would inevitably contact with the surface of the ground and not only effect rapid wearing away of the aprons, but cause their accidental release, and thus the discharge of the load before the proper point was reached.

Mounted in suitable bearings 47 on the uprights 21 is a shaft 48, carrying two grooved sheaves 49, around which pass the drive-ropes 7ª. The shaft 48 carries at one end a pulley or sprocket-wheel 50, which is driven from any suitable source of power, (unnecessary to be shown,) preferably by an engine carried by the power-truck and movable therewith. It might be stated at this point that the apparatus of this invention is capable of being transported from point to point, and for this reason all of the parts are made readily separable for this purpose. The sheaves 49 are provided in their perimeters with gaps or recesses 51, into which the cross-bars of the aprons are designed to take, and by this arrangement positive movement is imparted to the series of aprons in a continuous and certain manner.

*Strain-arresting mechanism.*—The strain-arresters 17, to which reference has been made and of which any number may be employed, according to the length of the apparatus, comprise each two uprights 52, connected and braced by cross-pieces 53 and wire tie-ropes 54, extending from the sill or base 55 around the outer ends of the lower cross-piece, thence around the intermediate cross-piece, and then between the uprights and secured at their upper ends to the cross-piece next to the top. Furthermore, the cross-braces 56 are employed to give added rigidity to the base portion of the arrester. The inner side of the uprights, as before stated, carry the tram-rope grips 39, and in order to permit of the grips being elevated or depressed, according to the distance which it is desired that the conveyer shall travel with relation to the ground, the uprights are provided with a plurality of orifices 57, through which the bolts 58 for holding the grips in position are passed. By this means the apron may be caused to travel at any desired distance above the ground and a change in its plane of travel may be readily and quickly effected with small labor and loss of time.

The sill or base 55 consists of two timbers suitably secured to the uprights, and between the sills is disposed a series of rollers 58', in this instance three in number, which are adapted to rest upon a sleeper 59. By the provision of the rollers the strain-arrester may be shifted laterally with relation to the power-truck, as desired.

*Balance-truck.*—The balance-truck 18, which is shown in detail in Figs. 8 and 9, is designed to support the tram-ropes opposite the power-truck and at the point where the carrier ceases to take on load and is constructed somewhat in the same manner as the power-truck. The bed or base is formed by longitudinal timbers 60, held together by pairs of cross-timbers 61 and 62, between which the lower ends of the uprights 63 and 63' are clamped, and between the lower pairs of cross-timbers are arranged rollers 63", in this instance four pairs, although this number may be increased or diminished if found necessary or desirable, said rollers resting upon sleepers 64. The rear sleeper nearest the power-truck bears against a post 65, which will positively hold the truck against longitudinal movement, and is further ballasted with earth for that purpose. The uprights also carry a plurality of rope-grips 39, as do the other or upright portions of the apparatus. As shown in Fig. 9, there is a clear and uninterrupted space between the uprights to permit passage of the carrier. The truck will have combined with it skeleton reels, upon which the sections of the carrier may be wound when not in use or when the apparatus is being transported. To shield the truck from unnecessary strain, a strong steel pin 66 is provided, which bears against one of the sleepers 64.

*Tripping mechanism.*—The trip-box (designated generally by 67 and shown in detail in Figs. 11 and 12) is provided for the purpose of dumping the load carried by the carrier by successively throwing the latches 6 out of engagement with the battens 5 of the aprons as each approaches the proper point. The trip-box comprises a plurality of cross-beams 68, to which are suitably bolted metallic hangers 69, each of which carries an inward-extending projection 70, upon which is secured a sill 71. Bolted upon each of the sills is a hollow rail 72, between which, at proper distances apart, are mounted sheaves 73, adapted to travel upon the tram-rope 11, and thus support the trip-box for movement. The cross-beams are further rendered rigid by planking 74, which will positively prevent any lateral yield of the parts.

Secured to the planking 74 are two longitudinal beams 75, constituting latch-trips, the forward end of each, or that facing the power-truck, being beveled at 76, and these beveled portions as the trip-box is moved engage with the latches of the conveyer and release the battens 5 and 6 (shown in Fig. 10) and permit the aprons to drop, and as soon as the latches have passed these latch-trips the springs 7 cause the latches to resume their normal positions, and thus be properly disposed to pick up or engage with the batten of a succeeding apron. As will be seen by reference to Fig. 11, the ends of the tracks 72 are inclined downward, as at 77, thus to permit the carriers to pass in between the sides of the trip-box without jar or impact. The trip-box is moved upon the tram-rope to release the aprons by an operator stationed at the embankment through the medium of a trip-rope, cord, or rope 78, and is returned to its normal position through a rope or cord 79 to be in position to release a succeeding apron. The cord 78, as shown in Fig. 1$^a$, passes from the embankment or place of deposit around the sheave 80, carried by the sheave-column 19, and is secured to the front portion of the trip-box, while the rope or cord 79 passes from the embankment or place of deposit around a sheave 81 on the balance-truck and has its free end secured to the trip-box. It will be seen in this arrangement that when the operator draws upon the trip-cord 78 the trip-box is moved forward and that upon exerting draft upon the cord 79 the trip-box will move in the opposite direction.

*Sheave-column.*—The sheave-column (designated generally 19 and shown in detail in Figs. 13 and 14) is designed to support the rear ends of the tram-ropes and also the terminal drive-rope sheaves 81$^a$, and between the said sheaves is disposed a drum 82 to facilitate the movement of the hanging aprons around the shaft. The resetting-drum 83, (shown in Fig. 5) is attached to the shaft 48 between the sheaves 49 on the power-truck, and as the cross-beams pass around the sheaves the apron-battens are brought up and thrown over the latches of the succeeding cross-beams, where they are held by gravity when the apron emerges, thus forming a continuous belt for the reception of the load. The sheave-column comprises two timbers 84, which are secured together at their lower ends and thence diverge outward, the intermediate and top portions of the uprights being connected and braced by cross-pieces 85. This column carries a plurality of small wheels 85ᵃ, around which the tram-ropes pass, and, as before stated, the tram-ropes at the sheave-column are carried down and secured in any suitable manner to the uprights thereof. The lower end of the sheave-column rests upon a ground timber or sill 86, and thus permits the column to move about a vertical axis or to swing, as may be necessary, in the direction of the tram-ropes and drive-ropes of the carrier. The column is held in position by guy-ropes 87, one end of each of which is secured to posts 88, sunk in the ground at the requisite distance from the structure, thence passed around sheaves 89 and 90, carried, respectively, by the posts 88 and by the sheave-column, thence back through the sheaves 89 and to the drums 91 of a windlass of the usual or any preferred construction. The drums carry gear-wheels 92, which mesh with pinions 93, carried by shafts journaled in the frame of the reel-box, and these pinions are engaged by a drive-pinion 94, actuated by a crank 95. This arrangement of gears is necessary in order to cause both of the guy-ropes to move in the same direction, and by this means the sheave-column may be rapidly and easily adjusted, as desired. When it is desired to move the bottom of the column, the same may be effected by an ordinary pinch-bar, as usual.

Having thus described the invention, what I claim is —

1. An apparatus of the class described embodying a series of flexible aprons, means for connecting the aprons to present a continuous structure, and means for releasing the forward apron of the series.

2. An apparatus of the class described, embodying a series of flexible aprons, means for connecting the aprons to present a continuous structure, means for releasing the forward apron of the series, and means for automatically assembling the released apron with a succeeding one.

3. An apparatus of the class described, embodying a plurality of flexible aprons, means for connecting the aprons to present a continuous structure, means for releasing an apron, and means for automatically assembling it with a succeeding apron.

4. An apparatus of the class described embodying a carrier comprising a plurality of aprons, a cross-beam carrying one end of each apron, a batten carried by the other end of each apron, and means for holding the cross-beam of each apron detachably connected with the batten of an adjacent apron.

5. An apparatus of the class described embodying a carrier comprising a plurality of aprons, a cross-beam carrying one end of each apron, locking devices carried by the cross-beam, a batten carried by the other end of each apron and engaging the locking devices of a succeeding cross-beam, and means for releasing the locking devices.

6. An apparatus of the class described, embodying a carrier comprising a plurality of aprons, a cross-beam carrying one end of each apron, locking devices carried by the cross-beam, a batten carried by the other end of each apron and engaging the locking devices of a succeeding cross-beam, means for releasing the locking devices, and means for reassembling the aprons.

7. An apparatus of the class described, embodying a carrier comprising a plurality of aprons, a cross-beam carrying one end of each apron and provided with latches, a batten carried by the other end of each apron and engaging with the latches of a succeeding cross-beam, means for releasing the latches, and means for reassembling the aprons.

8. An apparatus of the class described, embodying a carrier comprising a plurality of aprons, a cross-beam carrying one end of each apron and provided with latches, a batten carried by the other end of each apron and engaging with the latches of a succeeding cross-beam, means for releasing the latches, means for automatically returning the latches to their normal positions.

9. An apparatus of the character described, comprising a plurality of aprons, a cross-beam carrying one end of each apron and provided with latches, a batten carried by the opposite end of the apron and engaging the latches of a succeeding cross-beam, tram-ropes, sheaves carried by the cross-beams and engaging the tram-ropes, means for releasing the latches, and means for automatically reassembling the separated aprons.

10. An apparatus of the character described, embodying a carrier comprising a plurality of connected aprons, tram-ropes for supporting the apron-carriers, and a trip-box carried by the tram-ropes and operating to release an apron.

11. An apparatus of the class described, comprising a carrier embodying a plurality of connected aprons, grooved sheaves carried by the apron-supports, tram-ropes upon which the sheaves travel, latches carried by the apron-supports for holding the aprons connected, a trip-box movable on the tram-ropes, and trip devices carried by the box for releasing the latches.

12. An apparatus of the class described, embodying a sectional carrier, tram-ropes for supporting the carrier, means for releasing the sections of the carrier, and means for automatically reassembling or reconnecting said sections.

13. An apparatus of the class described, embodying an endless sectional conveyer, tram-ropes for supporting the conveyer, a strain-arrester and balance-truck, grips carried by the strain-arrester and balance-truck to retain the tram-ropes under requisite tension, and means movable on the tram-ropes for releasing the sections of the conveyer.

14. An apparatus of the class described, embodying an endless sectional carrier, tram-ropes for supporting the carrier, a strain-arrester and balance-truck carrying grips to retain the tram-ropes under requisite tension, and a trip-box movable on the tram-ropes for releasing the sections of the carrier.

15. An apparatus of the class described, comprising a pair of tram-ropes, a power-truck carrying reels to which one end of each of the tram-ropes is secured, interposed strain-arresters provided with grips for maintaining the tram-ropes under tension, and a sheave-column to which the other ends of the tram-ropes are secured.

16. An apparatus of the class described, embodying a movable power-truck, a plurality of movable strain-arresters, a movable balance-truck, a movable sheave-column, tram-ropes secured at one end to the sheave-column, tension devices carried by the power-truck with which the other ends of the tram-ropes are secured, and grips carried by the balance-truck and strain-arresters for maintaining the tram-ropes under adjusted tension.

17. An apparatus of the class described, embodying a plurality of connected aprons, cross-beams carrying one end of each of the aprons, latches carried by the cross-beams, a batten carried by the opposite end of the apron and adapted to engage the latches of a succeeding cross-beam, tram-ropes, sheaves carried by the cross-beams and engaging the tram-ropes, and guards disposed on each side of the sheaves to maintain them in operative position upon the tram-ropes.

18. An apparatus of the class described, embodying a wheeled power-truck and means for holding it against movement, a plurality of wheeled strain-arresters, a wheeled balance-truck, a fulcrumed sheave-column, and means for shifting the same, tram-ropes extending in a loop from the power-truck to the sheave-column, means on the power-truck for maintaining the tram-ropes under requisite tension, grips carried by the strain-arrester and balance-truck for maintaining the tram-ropes under adjusted tension, a sectional conveyer supported by the tram-ropes, and means carried by the tram-ropes for releasing the sections of the apron.

19. An apparatus of the character described embodying a sectional conveyer composed of a plurality of flexible aprons, means for holding the aprons in asssembled relation, means for releasing an apron at the proper point, actuating means for the aprons, and driving mechanism for imparting movement to the actuating means.

20. An apparatus of the class described, embodying a series of connected flexible aprons presenting a continuous structure, and means for releasing the forward portions of the aprons.

In testimony whereof I have hereunto set my hand in presence of two subscribing witnesses.

CALEB HARRISON PARKER.

Witnesses:
E. J. PICKENS,
E. HOLMES.